(12) United States Patent
Wang et al.

(10) Patent No.: US 7,948,264 B2
(45) Date of Patent: May 24, 2011

(54) SYSTEMS, METHODS, AND INTEGRATED CIRCUITS WITH INRUSH-LIMITED POWER ISLANDS

(75) Inventors: Yongliang Wang, Saratoga, CA (US); Daniel P. Nguyen, Campbell, CA (US)

(73) Assignee: SanDisk Corporation, Milpitas, CA (US)

( * ) Notice: Subject to any disclaimer, the term of this patent is extended or adjusted under 35 U.S.C. 154(b) by 147 days.

(21) Appl. No.: 11/967,580

(22) Filed: Dec. 31, 2007

(65) Prior Publication Data

US 2008/0211570 A1    Sep. 4, 2008

Related U.S. Application Data

(60) Provisional application No. 60/921,507, filed on Dec. 31, 2006, provisional application No. 60/934,936, filed on Dec. 31, 2006.

(51) Int. Cl.
H03K 19/173 (2006.01)
G06F 1/00 (2006.01)

(52) U.S. Cl. .......................................... 326/38; 713/300

(58) Field of Classification Search .................... 713/300
See application file for complete search history.

(56) References Cited

U.S. PATENT DOCUMENTS

| | | | |
|---|---|---|---|
| 5,528,190 A | 6/1996 | Honnigford | |
| 5,654,862 A | 8/1997 | Worley et al. | |
| 5,917,220 A | 6/1999 | Waggoner | |
| 6,414,533 B1 | 7/2002 | Graves | |
| 6,631,502 B2 * | 10/2003 | Buffet et al. | 716/4 |
| 7,000,214 B2 * | 2/2006 | Iadanza et al. | 716/18 |
| 7,051,306 B2 | 5/2006 | Hoberman et al. | |
| 7,348,804 B2 * | 3/2008 | Hoberman et al. | 326/82 |
| 7,415,680 B2 * | 8/2008 | Hoberman et al. | 716/1 |
| 2004/0268278 A1 * | 12/2004 | Hoberman et al. | 716/5 |
| 2005/0114814 A1 | 5/2005 | Correale, Jr. et al. | |
| 2006/0107077 A1 * | 5/2006 | Roth et al. | 713/300 |
| 2006/0158222 A1 | 7/2006 | Gattiker et al. | |
| 2008/0030223 A1 * | 2/2008 | Arsovski et al. | 326/38 |
| 2008/0077818 A1 * | 3/2008 | Rauschmayer et al. | 713/400 |
| 2008/0080107 A1 | 4/2008 | Chow et al. | |
| 2008/0229121 A1 * | 9/2008 | Lassa et al. | 713/300 |
| 2009/0049321 A1 | 2/2009 | Balatsos et al. | |
| 2009/0167093 A1 * | 7/2009 | Nguyen et al. | 307/80 |
| 2009/0204835 A1 * | 8/2009 | Smith et al. | 713/323 |
| 2009/0204837 A1 * | 8/2009 | Raval et al. | 713/330 |

OTHER PUBLICATIONS

International Search Report mailed Aug. 14, 2008, for International Application No. PCT/US2007/089205.
Written Opinion of the International Searching Authority mailed on Aug. 14, 2008, for International Application No. PCT/US2007/089205.
International Search Report mailed May 21, 2008, for International Application No. PCT/US2007/089190 (3 pages).
Written Opinion of the International Searching Authority mailed on May 21, 2008, for International Application No. PCT/US2007/089190 (2 pages).
U.S. Office Action dated Jul. 6, 2010, directed against U.S. Appl. No. 11/967,382, (9 pages).

* cited by examiner

*Primary Examiner* — Vibol Tan
*Assistant Examiner* — Dylan White
(74) *Attorney, Agent, or Firm* — Brinks Hofer Gilson & Lione

(57) ABSTRACT

A new approach for managing turn-on of power islands uses a precharge phase to begin the process of bringing up the island's internal supply voltage, while minimizing transients and associated power-control-logic instability.

11 Claims, 7 Drawing Sheets

| Island | Description |
|---|---|
| SD HIM | sd_him (normally static Voltage Island) Secure Digital – contains all the front end logic for this host interface module |
| MS HIM | msx_him (normally static Voltage Island) Memory Stick – contains all the front end logic for this host interface module |
| USB HIM | usb_him (normally static Voltage Island) – both 3.3V and 1.2V sections exist but do not power down independently from each other). Universal Serial Bus - contains all the front end logic for this host interface module + the USB PHY |
| CRYP | crypto (normally dynamic Voltage Island non-NVM CryptoFlash block) – Note that the NVM part of this logic, design1/be/bmu/cypto/cryptoflash/crypto_engines_i/eprom_top_i/ eafuse_256BHLOPUZ_i/aefuse, should be placed in always on island and isolated from rest of crypto logic. |
| RAM2 | oram_wrap (normally dynamic Voltage Island – 128K ORAM |
| BE3/RAM1 | ALWAYS_ON – All remaining Tripoli logic (Be3, island control, pad control), memory(MRAM, SBRAM, ROM, FRAM, ERAM, etc.), and Analog modules (ACOMP, ASECURE) not included in the previous 5 islands is considered to belong to the Always_on island. Though this is not exactly an island, it is considered as such when inter-island isolation must be applied. |
| NVM | ALWAYS_ON – (with Be3) – Non-Volatile Memory block where Secure Key information is stored. This is not a separate island (powered with rest of Be3), but it is located within the CryptoFlash module hierarchy, and is primarily controlled by that block. However, the NVM security state registers are kept on even when CRYP is suspended to avoid long duration key reload operations. |

FIG. 5

SYSTEMS, METHODS, AND INTEGRATED CIRCUITS WITH INRUSH-LIMITED POWER ISLANDS

CROSS-REFERENCE TO RELATED APPLICATIONS

Priority is claimed from U.S. applications 60/934,936 (formerly numbered as Ser. No. 11/618,854) and 60/921,507 (formerly numbered as Ser. No. 11/618,855)), both filed Dec. 31, 2006, and each hereby incorporated by reference in its entirety.

BACKGROUND

The present application relates to systems and integrated circuits which include multiple independently powered-up "power islands" inside a single integrated circuit.

Many portable electronic systems are critically limited by battery life. For example, users do not like heavy cell phones, but users also do not like their cell phones to run out of power and shut down. One way to improve battery life is to increase the energy efficiency of the electronics components in the portable system.

As the constraints of low-power integrated circuits have steadily become tighter, the technique of power islands has become more important. In this technology some portions of an integrated circuit are powered up only on an "as-needed" basis. Some implementations have used variable clock frequency for individual power islands, see e.g. U.S. Pat. No. 7,051,306, which is hereby incorporated by reference in its entirety. Some implementations have selectable supply voltage levels for individual power islands, see e.g. U.S. Pat. No. 7,080,341, which is also hereby incorporated by reference in its entirety. Some implementations even use "smart" supply voltage switching, where the timing of supply switching to power islands is fine-tuned to avoid out-of bounds transients: see e.g. US 2006/0190744, which is also hereby incorporated by reference in its entirety.

It should be noted that power islands technology is very different from smart power technology. See e.g. Smart Power ICs (2.ed. Murari et al. 1995). In smart power technology logic or mixed-signal stages, operating at normal supply voltages, are combined in the same chip with higher-voltage driver circuits. Special device structures, which would not be used in a pure logic or mixed-signal chip, are commonly used to permit use of both high-voltage and low-voltage areas.

The use of on-chip power islands has many advantages for reducing power consumption, but the inventors have realized that there are also some surprising difficulties, which are addressed by the various inventions described in the present application. Some of the points of invention will now be described, followed by additional explanation of the benefits of those points.

SUMMARY

The present application discloses new approaches to power island management. When power is applied to a power island (within an integrated circuit which is under power), the island's local power supply bus is not allowed to draw too much current. In some embodiments, this is implemented by imposing a delay between the turn-on of a precharge device and the turn-on of a larger device. In some embodiments, this delay is locally generated. In some embodiments, one switching stage provides a logic output which indicates that its turn-on has been completed, and this logic output then launches turn-on of another switching stage. Many implementation details, modifications, and variations are described below.

Following is some further background, and explanation of advantages, which does not necessarily limit any of the claimed inventions.

In advanced power-island implementations, the turn-on of a power island can add a significant capacitance. Some part of the chip will always be active (if the chip itself has been powered up), to supervise the power-island management, and to respond to interrupts or external conditions. However, this always-on part of the chip will inherently have some nonzero leakage current, which is undesirable. Thus in designing a chip with power-island implementation, it is highly desirable to keep the leakage current through the always-on section minimal, and this means that the area of active devices in the always-on section should preferably be minimized.

A second factor is that some power islands have a relatively large indivisible size. For example, one realistic example is the cryptographic engine used in secure data carriers. In some cases the capacitance of a single power island can be comparable to that of the always-on portion of the chip.

The power supply to a chip will typically be stabilized by a large external capacitance, on the order of a microfarad. However, the connection to this external capacitance must be routed out through leads which inherently have inductance, so there is inherently some time constant between the energy stored in this external capacitance and the current drawn on-chip.

The combination of these factors has a surprising result: the simple turn-on of a power island can produce a voltage transient, due to charge sharing, which can be large enough to trigger a power-invalid response from a power-on-reset circuit, or to cause other problems. The inventors have realized that power island design now requires consideration of inrush current management.

The various solutions provided by the present application provide a variety of alternative ways to avoid such problems. One advantage of many of these embodiments is that they are easily compatible with modern ASIC design practices, in which blocks of "IP" are inserted as a unit. By using a power-island control switch module as described below, compatibility with a variety of design modules is easily achieved.

The preferred embodiments use a precharge phase to bring up the voltage of the island's power supply, before the main switch is turned on. This not only reduces transient problems, but also means that the main switch can be made as large as desired. The on-resistance of the main switch (Rdson) contributes a wasted power component, in the form of ohmic losses, which is undesirable.

The disclosed innovations, in various embodiments, provide one or more of at least the following advantages:
Lower power consumption.
Reduced generation of voltage transients.
Easier use of existing IP in power island designs
Less risk of power-control instability.
Less risk of voltage transients being propagated.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 5 shows a table of power island descriptions.

DETAILED DESCRIPTION OF THE PREFERRED EMBODIMENTS

The numerous innovative teachings of the present application will be described with particular reference to presently preferred embodiments (by way of example, and not of limitation).

Dynamic Island Control

In the sample embodiment discussed below, ORAM (overlay RAM) was identified as the least disruptive section of system RAM to be powered-down during suspend.

A similar consideration of the Back End logic modules led to the Crypto Engine. This component already possessed a clean modular boundary inside the BMU, and it ran off its own clock tree. Additionally, as a recently developed IP, it had already been designed to support power-down and resume. Only minor state machine modifications and isolation logic were required to support the power transitions. And as noted, its overall gate count was large enough to provide the needed savings when combined with the ORAM shutdown.

Figure 4A:
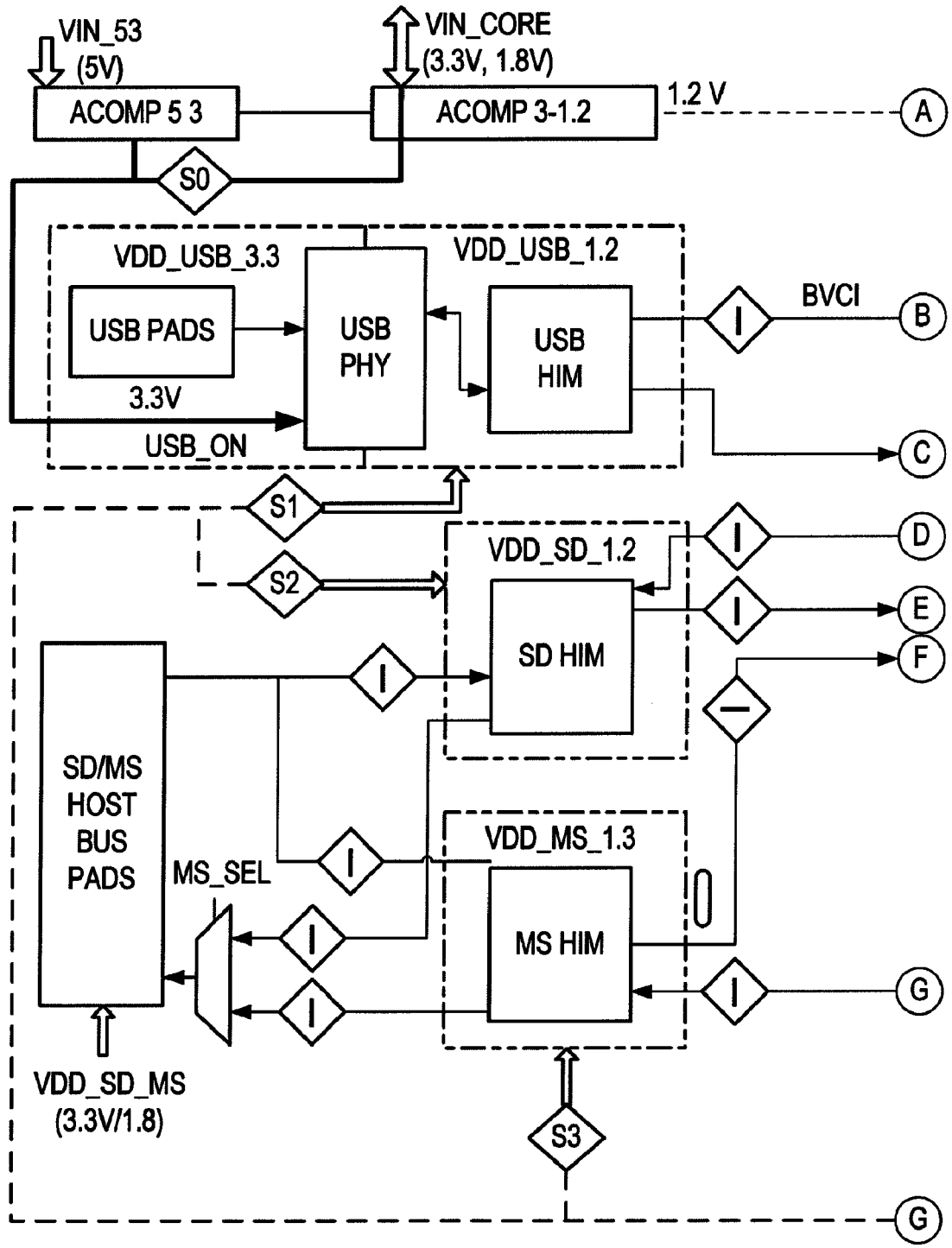
FIGS. 4a and 4b are two parts of a single drawing, which shows the power island implementation of the chip of FIG. 3.

The sample embodiment (referred to as "Tripoli") supports 5 power islands, and one ALWAYS ON domain. FIGS. 4a/b illustrate the power island partitioning. ("Power islands" or "Voltage islands" refer to sections of the chip that can be powered on/off independently from other areas of the chip to minimize the total power budget during non-operation, standby or test modes.)

The ALWAYS ON domain includes the Back End, half of the System RAM (MRAM, SBRAM, FRAM, ERAM), the NVM, and the Tripoli Top power, product configuration, and voltage island control logic (ACOMP/ASECURE blocks, 10 pad ring and miscellaneous glue logic). See Table 2 (FIG. 5) for a description of each voltage island/domain.

Island Control Mechanisms

Once the logic and RAM have been logically partitioned into discrete islands, several mechanisms must be added to control the islands and enable standby power savings under the necessary product configurations and conditions:

System Core power gating and control (Host supply regulation and Analog power isolation switches)

Product package detection (SD/MMC, USB, or MS product configuration)

Static Island configuration (enable one HIM, disable other two)

Dynamic Island control and status (CRYPTO, ORAM power-up, power-down sequence timing)

Logic Gate Isolation Control (ON-Island isolation from OFF-island(s) effects)

The following sections will briefly describe these mechanisms.

Figure 4B:
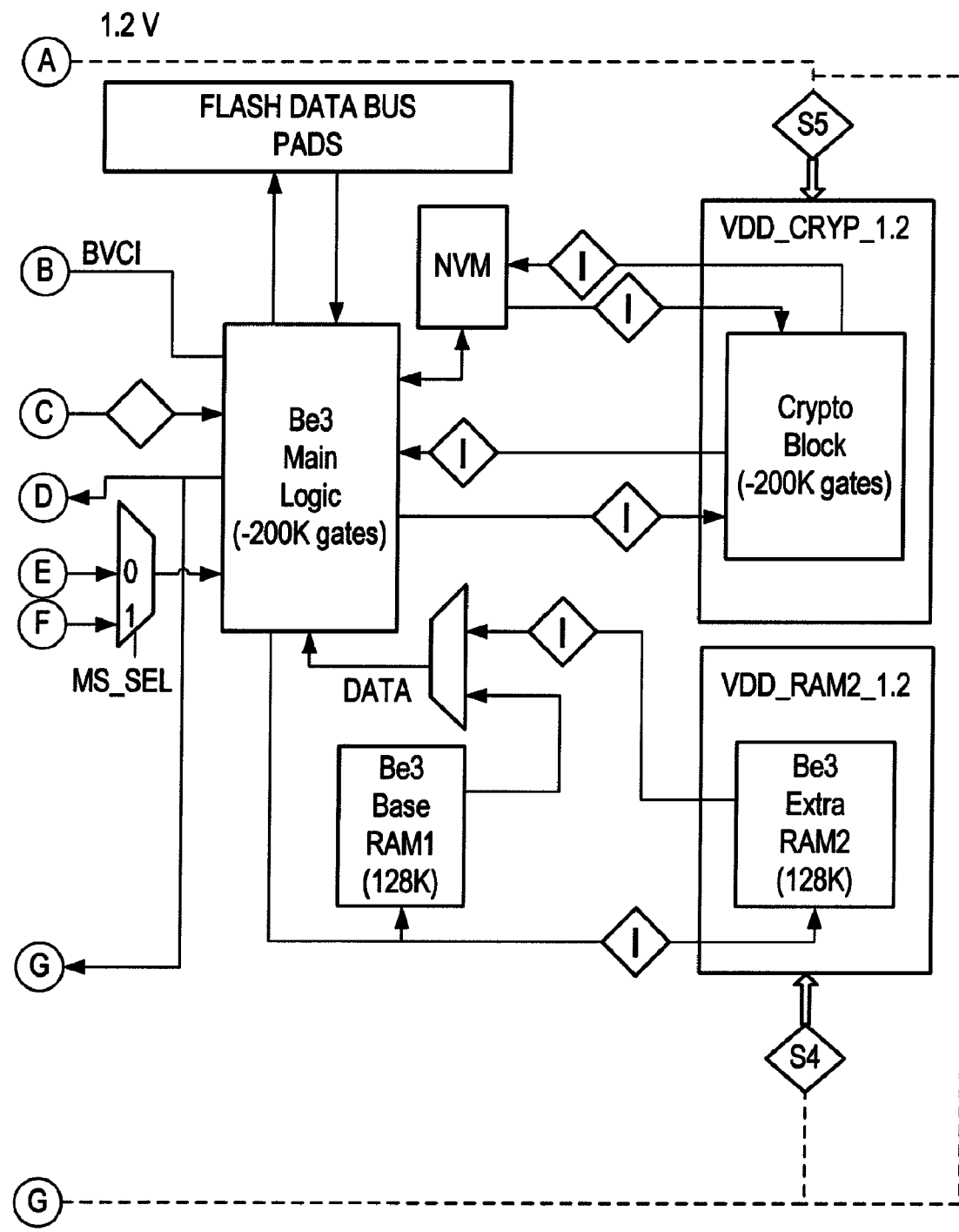

FIG. 4, "TripoliSXp3 Power Islands" illustrates the power supply routing, product detection, Static and Dynamic island switching, and logic isolation control requirements needed in Tripoli.

System Core Power Gating and Control (Analog Switches)

In this sample embodiment, Tripoli handles three major Power functions:

Regulation of host-supplied power from either a (3.3V or 1.8V) SD/MMC or MS host, or a (5V) USB host.

Switching the supply lines to the required power islands based upon the static (product configuration) and dynamic island control (for standby suspend and resume) of the Crypto and ORAM power islands.

Island Supply switching control and status—Analog power switching must minimize impact on system Core power.

Host Supply Regulation

Figure 3:
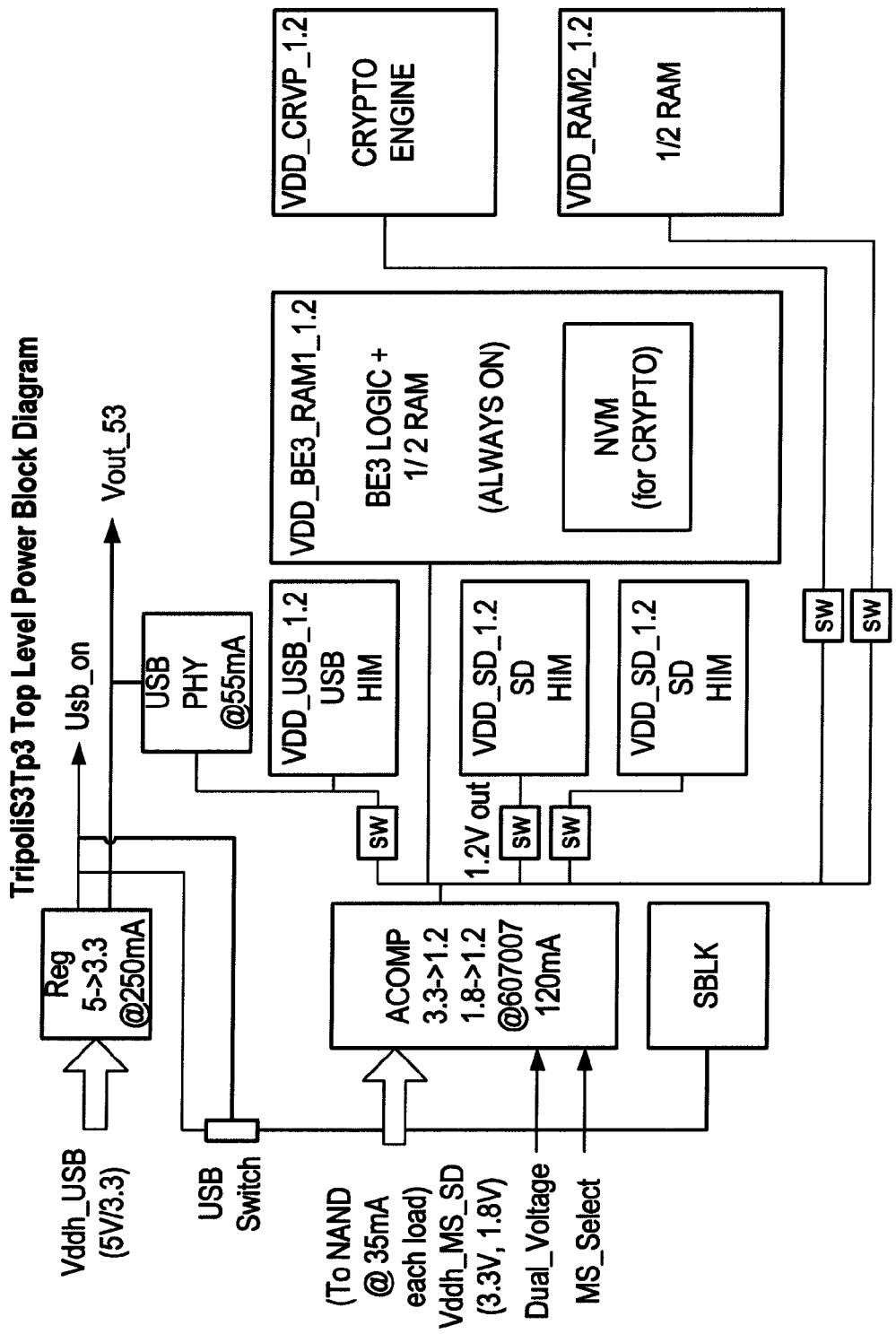
FIG. 3 shows an example of power relations used in a sample chip which implements an embodiment of the present innovations.

FIG. 3 illustrates the power relations in the "Tripoli" chip which is used as an example. In this sample embodiment, Tripoli must regulate the Host supply to provide a Core voltage of 1.2V for internal logic. In SD, MMC, or MS product modes, the Host provides a 3.3V or 1.8V supply. A portion of this current supplies the I/O pads on the ASIC (VDDH, VDDF), as well as the external NAND memory, while the remainder is regulated by an internal Core regulator to provide a 1.2V supply to the ASIC Core logic.

For USB, an additional Regulation step is needed before the Core regulator. The USB Host provides a 5V supply, which is first regulated to 3.3V then provided to the internal Core regulator mentioned above. Additionally, in USB product mode, the 3.3V output of the 5-3.3 Regulator and the 1.2V output of the Core regulator are driven out of the ASIC (on VOUT_53 and VOUT_CORE respectively) where they are filtered and then provided to USB PHY supply inputs (A3V3, A1V2, and DIV2).

Host and Regulated Supply Switching

In the sample embodiment, both types of product configurations (SD, MMC, MS vs. USB) must function properly with the shared power paths. The SD+ configuration, having both SD and USB power hookups at the same time in a unified product package, presents further challenges to manage the various power supply options. In order to limit the active and standby current in the products that do not support USB, the power bus is switched to isolate the USB PHY and USB device core when no 5V Host supply is present. Additionally, the 1.2V Core voltage is switched off for the two HIM islands that are not in use for each product configuration.

Finally, the CRYPTO block and ORAM block may be independently switched on and off dynamically to save standby power. These blocks consume significant levels of current that together with the always_on island would exceed the standby current spec for SD products.

Island Supply Switching Control and Status

In the sample embodiment, two kinds of voltage island bypass switches are preferably implemented in Tripoli to deliver power to the Islands and the USB PHY. A light-duty switch with maximum switch resistance of 2 ohms is used to power-up or down the HIMs, the Crypto, and the RAM2. A second heavy-duty switch with 1 ohm on resistance is used to power or isolate the USB PHY.

In preferred embodiments, there exists an RC delay circuit to provide delay between the two transistors, so there is only one control line in this example. In this example the larger transistor's dimensions are preferably 2100 micron/0.13 micron, while the smaller transistor's dimensions are preferably 300 micron/0.13 micron.

Of course the actual transistor dimensions will be different in different implementations, depending on process capability, clock speed, the size of the particular power island, and other factors. However, the ratio between the larger and smaller high-current transistors is a more "portable" number, which can be used as a design rule of thumb in implementing future variations of the disclosed inventions. Preferably the ratio between larger and smaller drivers is at least 2:1, and more preferably 4:1.

Figure 1A:
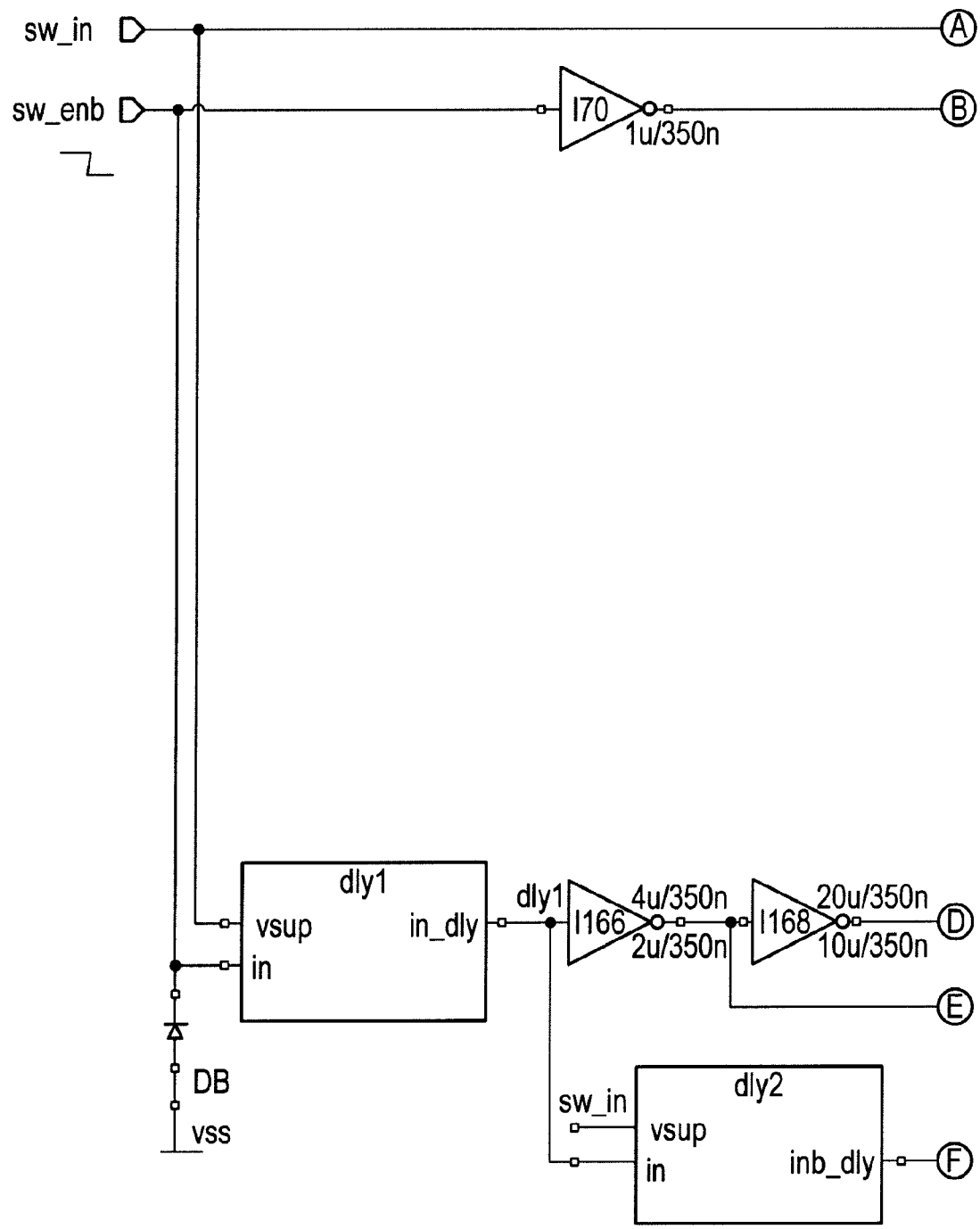
FIGS. 1A and 1B are parts of a single drawing, which schematically shows an example of a switching configuration consistent with an example of the present innovations.
Figure 1B:
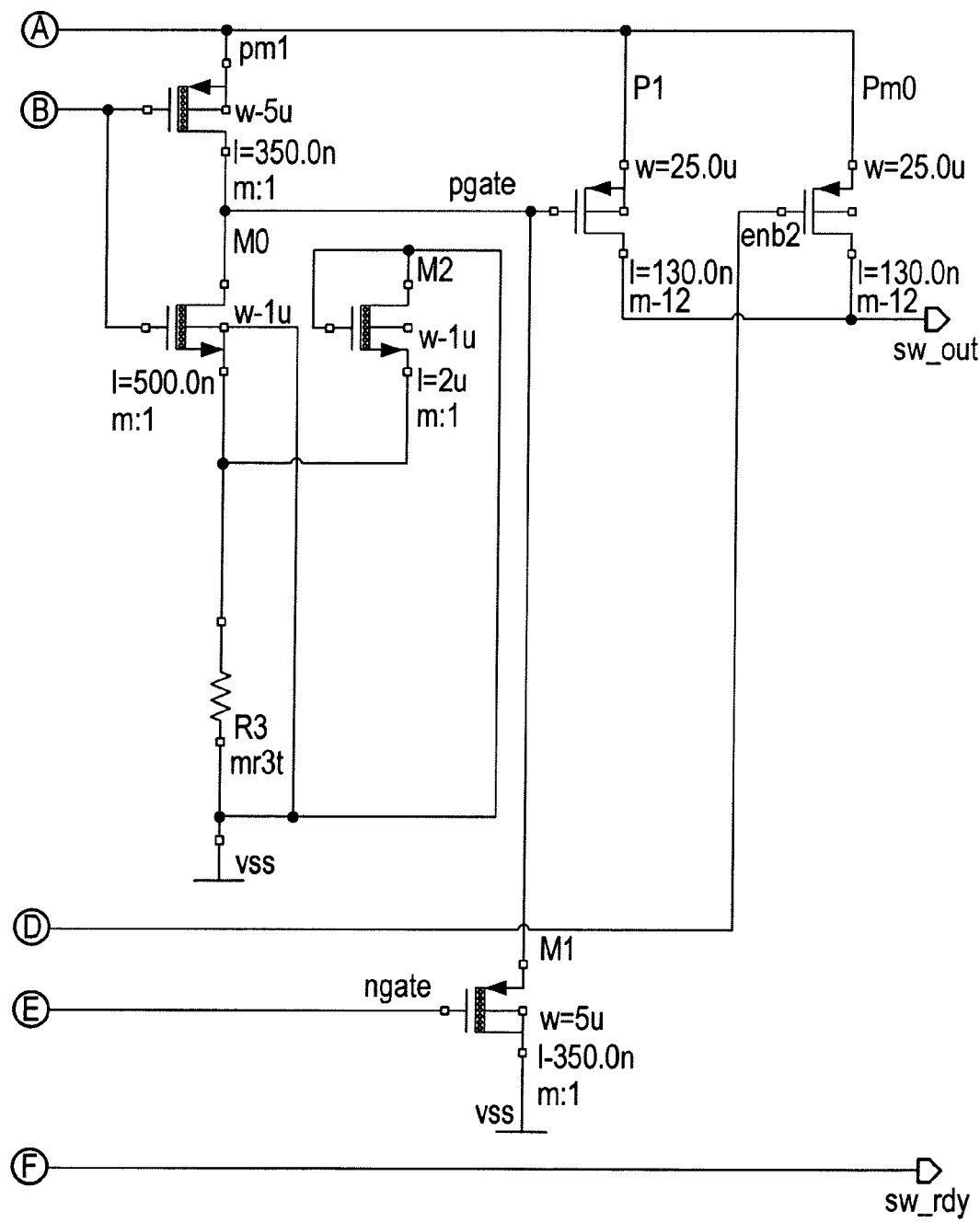

FIGS. 1A and 1B show a detailed example of an embodiment of a two-phase switching relationship. In order to minimize VDD droop when an island is turned on, the switches have a two phase turn-on with parallel resistance: the switch with higher resistance limits inrush current, and the one with low resistance is turned on after a delay. Due to active current and ohmic (IR) drop requirements multiple switches are used in parallel for some Tripoli islands (ram2, cryp and usb). In the example shown in this Figure, the switches have 2 inputs and 2 outputs:

sw_in—this is the source rail input which in Tripoli is connected directly to the output of a 1.2V core regulator (with the exception of the USB PHY 1.2 V switches which are connected from pins A1 V2 and D1 V2 indirectly driven from VOUT_CORE on circuit board through filters outside the chip for USB products)

sw_out—this is the switch output that powers the island connecting the island VDD rail to the sw_in rail.

sw_enb—this is the switch enable (active low) driven by the power control logic. When this signal is asserted the high resistance part of the switch is turned on. About 1 microsecond later the low resistance part of the switch is turned on. About 1 microsecond later the switch is done with its power up of the island.

sw_rdy—this is a 'switch ok' indicator that is asserted when the switch enable signal gets asserted, and de-asserted within nanoseconds after the switch enable gets de-asserted.

The illustrated circuit implementation is a very simple example, and can be varied (consistently with the above general teachings) in a wide variety of ways. When sw_enb goes low (active), inverter 170 turns off PMOS pm1. In this sample implementation, the two large PMOS drivers P1 and Pm0 have equal sizes. (The device W/L dimensions are given in microns "u" or in nanometers "n".) However, as noted above, this is not necessarily true in all embodiments. Note also that delay stage dly1 defines the delay from when sw_enb goes low to when line enb2 turns on pull-up driver Pm0. The delay stage dly2 defines the additional delay until signal sw_rdy goes active. (Note that sw_rdy is Driven by a Complemented Output of dly2.)

Figure 2:
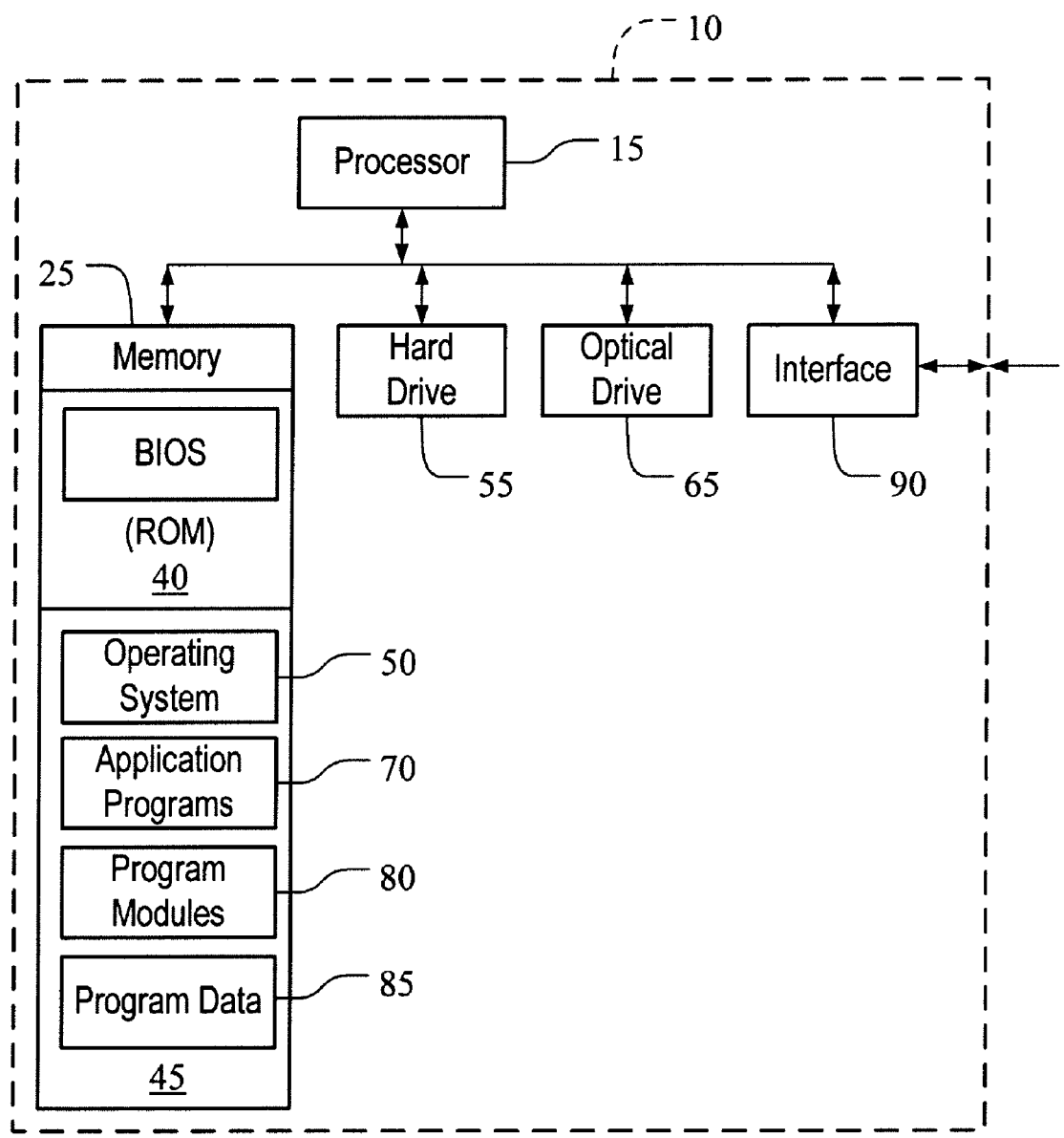
FIG. 2 shows a system context consistent with implementing an embodiment of the present innovations.

FIG. 2 is a diagram of a hardware and operating environment which can advantageously be used with an integrated circuit having power island control like that described above. This environment includes a general purpose computing device in the form of a computer system 10, including a processor 15, a memory 25, and a bus 30 that operatively couples various system components including memory 25 to processor 15. There may be only one or there may be more than one processor 15. The computer system 10 may be a conventional computer, a distributed computer, or any other type of computer; the invention is not so limited. The bus 30 is connected to interface 90, which may be any of several types of bus structures including a memory bus or memory controller, a peripheral bus, and a local bus using any of a variety of bus architectures. Interface 90 includes a direct memory access (DMA) controller that transfers data and commands between memory 25 and I/O devices. The memory 25 includes read only memory (ROM) 40 having a basic input/output system (BIOS) 50 and random access memory (RAM) 45. RAM 45 may contain at various times operating system 70, application programs 75, program data 85 and program modules 80 including drivers which are discussed in more detail below. This sample embodiment is not the only system embodiment which is contemplated as advantageous; indeed handheld or smaller battery- or photovoltaic-powered electronic systems can be even more advantageous, since the power savings and yield improvement produced by the disclosed inventions can be even more important in such ultra-low-power cost-sensitive applications.

According to various embodiments, there is provided: A method for operating an integrated circuit which contains multiple power islands, comprising the actions of: a) when operation of circuitry in a power island is desired, then ramping up the supply voltage of that power island; and b) then, after step (a), connecting the power island supply voltage line to the primary on-chip supply voltage. According to various embodiments, the ramping action is performed by passing current through one more precharge transistors, and action (b) is performed by passing current through one or more additional transistors which collectively have less than one-third of the on-state impedance of the precharge transistor. According to various embodiments, the ramping action is performed by passing current through one or more precharge transistors, and the action (b) is performed by passing current through one or more additional transistors which collectively have less than one-third of the on-state impedance of the precharge transistor, wherein a delay between action (a) and action (b) is determined by a delay stage which automatically turns on the additional transistors after action (a).

According to various embodiments, there is provided: A method for operating an integrated circuit which contains multiple power islands, comprising the actions of: a) when operation of circuitry in a power island is desired, then turning on a precharge circuit which is connected to drive a local supply voltage line of said respective power island; and then b) after a delay, turning on a switch, which is connected in parallel with said precharge circuit, to reduce the impedance to said power island supply voltage line. According to various embodiments, the ramping action is performed by passing current through one or more precharge transistors, and action (b) is performed by passing current through one or more additional transistors which collectively have less than one-third of the on-state impedance of the precharge transistor.

According to various embodiments, there is provided: A method for operating an integrated circuit which contains multiple power islands, comprising the actions of: a) when operation of circuitry in a power island is desired, then turning on a first element which is connected to drive a local supply voltage line of said respective power island, and to automatically generate a logic output indicative of turn-on; and then b) in dependence on said respective logic output, turning on a second element, which is connected in parallel with said first element, to reduce the impedance to said local supply voltage line. According to various embodiments, the second element has less than one-third of the on-state impedance of the first element.

According to various embodiments, there is provided: An integrated circuit comprising; at least one power island, containing electrical circuits which are not always powered up; a switch connected to feed power to said island; at least one precharge circuit, connected in parallel with said switch; and a control element which turns on said switch only after said precharge circuit. According to various embodiments, the control element is a delay element having an RC time constant of more than 100 nanoseconds.

According to various embodiments, there is provided: An integrated circuit comprising: at least one power island, containing electrical circuits which are not always powered up; a switch connected to feed power to said island; and at least one precharge circuit, connected to ramp up the voltage in said island before said switch turns on.

According to various embodiments, there is provided: an integrated circuit comprising: multiple power islands, each containing electrical circuits which are not always powered up; and a respective multicomponent switching unit connected to feed power to said island; wherein separate components of said switching unit are connected to turn on at different times when said switch is turned on.

According to various embodiments, there is provided: An integrated circuit comprising: at least one power island, containing electrical circuits which are not always powered up; means for supplying power to said power island while limiting transient current at turn-on.

According to various embodiments, there is provided: A system comprising: an integrated circuit as above; and an additional logic component which is operatively connected to communicate with said integrated circuit.

According to various embodiments, there is provided: A new approach for managing turn-on of power islands, which uses a precharge phase to begin the process of bringing up the island's internal supply voltage, while minimizing transients and associated power-control-logic instability.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

For example, the large switching transistors can be (and often are) implemented with multiple physically separate channels, i.e. as a parallel combination of smaller transistors to make up the desired total channel width. This is unimportant, since it does not affect the relevant electrical behavior of the transistors.

For another, the gate voltage of the precharge transistor and/or the main switch transistor(s) can optionally be ramped, to provide a further removal of transients.

For another example, more than two transistors can optionally be combined, to provide a multistage turn-on with more than two phases.

For another example, in embodiments which use logical sequencing between different stages of turn-ons, the logical relations can be different and/or more complicated than those given in the illustrative embodiments above.

Reference is also made to the following commonly owned and copending U.S. patent applications, each and every one of which is hereby incorporated by reference in its entirety: 60/934,936 filed Dec. 31, 2006; 60/921,507 filed Dec. 31, 2006; 60/934,918 filed Dec. 31, 2006; 60/934,917 filed Dec. 31, 2006; 60/999,760 filed Dec. 31, 2006; 60/934,923 filed Dec. 31, 2006; 60/934,937 filed Jan. 1, 2007; 60/921,508 filed Jan. 1, 2007; Ser. No. 11/618,849 filed Dec. 31, 2006; Ser. No. 11/618,852 filed Dec. 31, 2006; Ser. No. 11/618,865 filed Dec. 31, 2006; Ser. No. 11/618,867 filed Dec. 31, 2006; Ser. No. 11/649,325 filed Dec. 31, 2006; Ser. No. 11/649,326 filed Dec. 31, 2006; Ser. No. 11/965,943 filed Dec. 28, 2007; Ser. No. 11/966,012 filed Dec. 28, 2007; and Ser. No. 11/966,147 filed Dec. 28, 2007. None of these applications are necessarily related to the present application, but many of these help to show features which were designed into the same system as the ideas described above, and/or which combine synergistically with those ideas. Some ones of these copending applications may have overlapping inventorship with the present application, and hence be eligible for a domestic priority claim under U.S. law, but priority is not necessarily claimed nor disclaimed at this time.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for operating an integrated circuit which comprises at least one power island, the method comprising:
    ramping up a supply voltage of a power island by passing current through one or more precharge transistors in response to detecting a desire to operate circuitry of the power island; and
    connecting a power island supply voltage line associated with the power island to a primary on-chip supply voltage by passing the current through one or more additional transistors after ramping up the supply voltage of the power island;
    wherein a delay between ramping up the supply voltage of the power island and connecting a power island supply voltage line of the power island to the primary on-chip supply voltage is determined by a delay stage which automatically turns on the additional transistors after ramping up the supply voltage of the power island; and
    wherein the delay stage has a RC time constant of more than 100 nanoseconds.

2. The method of claim 1, wherein the integrated circuit includes an always-ON portion, which is powered on whenever the integrated circuit is powered on, and the always-ON portion initiates the ramping up of the supply voltage of the power island, and the power supply voltage line of the power island is automatically connected to the primary on-chip supply voltage whenever ramping up of the supply voltage of the power line has been initiated.

3. A method for operating an integrated circuit which comprises at least one power island, the method comprising:
    turning on a precharge circuit which is connected to drive a local supply voltage line of a power island upon a desire to operate circuitry of the power island, the turning on of the precharge circuit causing current to pass through one or more precharge transistors; and
    after turning on the precharge circuit and a delay, turning on a switch, which is connected in parallel with the precharge circuit, to reduce an impedance to the power island supply voltage line, the turning on of the switch causing current to pass through one or more additional transistors which collectively have less than one-third of a collective on-state impedance of the one or more precharge transistors;
    wherein a delay stage turns on the switch, the delay stage having a RC time constant of more than 100 nanoseconds.

4. The method of claim 3, wherein the switch and the precharge circuit have control terminals which are electrically connected to automatically turn on sequentially in response to a single control input.

5. The method of claim 3, wherein the delay stage determines the delay between turning on the precharge circuit and turning on the switch, and the delay stage automatically turns on the additional transistors after turning on the precharge circuit.

6. The method of claim 3, wherein the integrated circuit includes an always-ON portion, which is powered on whenever the integrated circuit is powered on, wherein the always-ON portion initiates the turning on of the precharge circuit and wherein the switch is automatically turned on whenever the precharge circuit has been turned on.

7. A method for operating an integrated circuit which comprises at least one power island, the method comprising:
 turning on a first element which is connected to drive a local supply voltage line of a power island and automatically generating a logic output that indicates the first element has been turned on upon a desire to operate circuitry of the power island; and
 turning on a second element, which is connected in parallel with the first element, to reduce an impedance to the local supply voltage line based on the logic output that indicates the first element has been turned on;
 wherein a delay element connects the second element in parallel with the first element after the second element is turned on, the delay element having a RC time constant of more than 100 nanoseconds;
 wherein the second element has less than one-third of the on-state impedance of the first element.

8. The method of claim 7, wherein the integrated circuit includes an always-ON portion, which is powered on whenever the integrated circuit is powered on, wherein the always-ON portion initiates the turning on of the first element and wherein the second element is automatically turned on whenever the first element is turned on.

9. An integrated circuit comprising:
 a power island comprising electrical circuits which are not always powered up;
 a switch connected to feed power to the power island;
 at least one precharge circuit, connected in parallel with the switch, to drive a local supply voltage line of the power island; and
 a control element which turns on the switch to connect the at least one precharge circuit to the local supply voltage line of the power island only after the precharge circuit has been turned on;
 wherein the control element is a delay element having a RC time constant of more than 100 nanoseconds.

10. The integrated circuit of claim 9, wherein the precharge circuit has a weaker drive output than the switch.

11. The integrated circuit of claim 9, wherein the control element is located near the precharge circuit and the switch, and generates a delay locally, after turning on the precharge circuit, before turning on the switch.

* * * * *